UNITED STATES PATENT OFFICE.

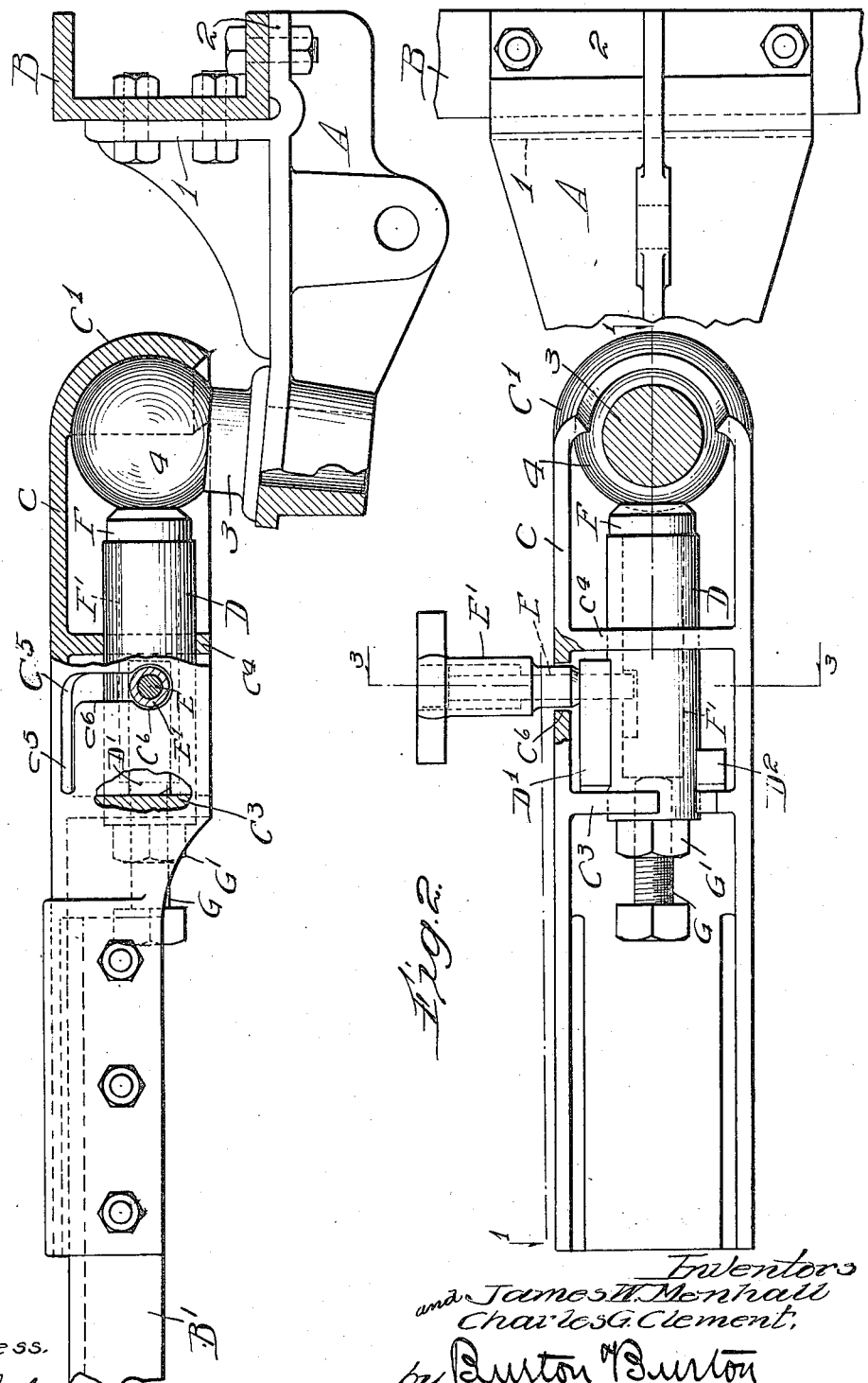

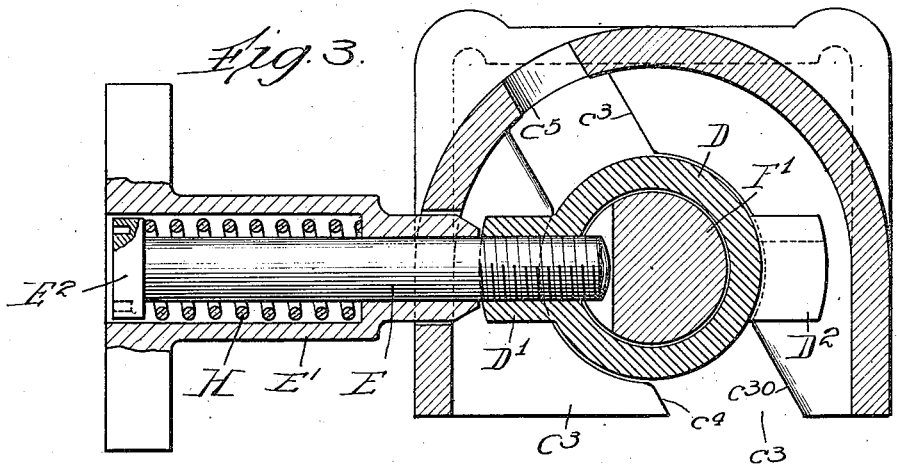
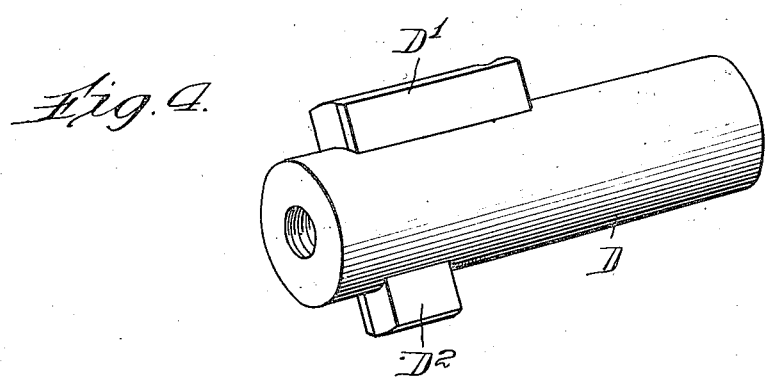
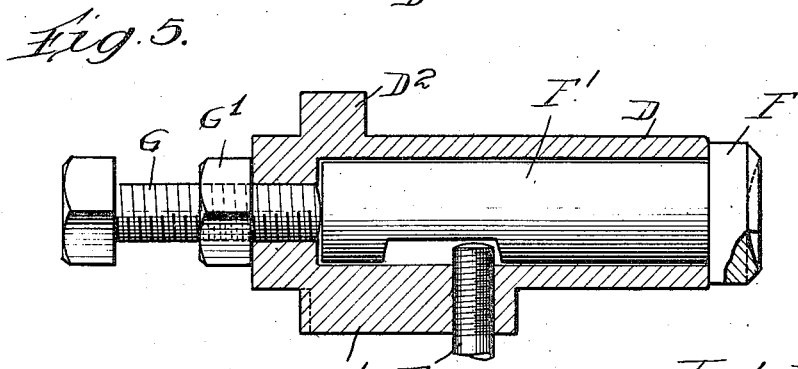

JAMES W. MENHALL AND CHARLES G. CLEMENT, OF EDGERTON, WISCONSIN, ASSIGNORS TO HIGHWAY TRAILER COMPANY, OF EDGERTON, WISCONSIN, A CORPORATION OF WISCONSIN.

TRACTOR-TRAILER COUPLING.

1,281,049.  Specification of Letters Patent.  Patented Oct. 8, 1918.

Application filed September 10, 1917. Serial No. 190,479.

*To all whom it may concern:*

Be it known that we, JAMES W. MENHALL, and CHARLES G. CLEMENT, residing at Edgerton, in the county of Rock and State of Wisconsin, have invented new and useful Improvements in Tractor-Trailer Couplings, of which the following is a specification, reference being had to the accompanying drawings, forming a part thereof.

The purpose of this invention is to provide an improved construction of a tractor trailer coupling, the primary specific purpose being to provide means for securely retaining a ball member of such coupling in a socket member thereof with reliable means of resistance to rearward thrust, and convenient means for locking and disengaging the ball. It consists in the elements and features of construction shown and described as indicated in the claims.

In the drawings:

Figure 1 is a partly sectional side elevation of a coupling embodying this invention, the same being shown with its two members secured respectively to a tractor and a trailer, section being at the line, 1—1, on Fig. 2.

Fig. 2 is a bottom plan view of the coupling device detached from both tractor and trailer.

Fig. 3 is a section at the line, 3—3, on Fig. 2.

Fig. 4 is a perspective view of a plunger or follower for retaining the ball in the socket of the joint.

Fig. 5 is an axial section of said plunger, and its associated parts.

The coupling shown in the drawings comprises the tractor member, A, which as illustrated, is adapted to be bolted fast to a rear transverse bar, B, of the tractor frame, said member, A, having for that purpose flanges, 1 and 2, forming an angle seat for the transverse bar, B. From the rear end of said member, A, the stem, 3, projects upward at an acute angle to the rearward trend of said member, A, for carrying at its upper end the ball, 4, which constitutes one member of the ball-and-socket joint of the coupling. The acute angular trend of the ball stem with respect to the body of said member, A, which may be understood as designed to project rearward horizontally from the tractor, is adopted for the purpose of affording as wide a range as possible for vertical oscillation of the two members of the joint with respect to each other in operation; for it will be seen that the ball can be seated forwardly in the socket member of the joint over a segment which at horizontal or directly alined position of tractor and trailer extending down toward stem of the ball, stops short of said stem by as many degrees as the maximum change of angle from direct alinement, and if the stem were vertical,— that is, at right angles to the normal horizontal trend of the member, A, then deducting the necessary number of degrees for the diameter of the stem, and an additional number of degrees for the maximum upward forward trend of the tractor above horizontal, the segment remaining below the horizontal axis of the ball-and-socket joint would be too limited for secure engagement of the members, hence this segment area is increased by making the ball stem inclined forward at an acute angle to the horizontal rearward trend of the member, A.

The socket member, C, having at its forward end the spheroidal socket, $C^1$, for seating the ball, is channel-shaped at the rear part for fitting upon the forwardly-projecting tongue or pole piece, $B^1$, of the trailer. At the forward part of said channel portion back of the spheroidal socket, $C^1$, said member, C, affords a housing for the plunger, D, which has the function of holding the ball, 4, snugly in the socket, said socket member being open at the lower side for introduction of the ball, and the plunger being adapted to be advanced forward against the ball after it is in place to thus retain it. For suitably mounting the plunger in the housing afforded as above described, the channel cavity of said housing is provided with two transverse webs, $C^3$ and $C^4$, in which the plunger is slidable and rotatably journaled. Between these two transverse webs the plunger is provided with two oppositely-projecting substantially radial wings or lugs, $D^1$ and $D^2$, which stop against the rear web, $C^3$, for holding the plunger with its forward end or head against the ball to hold the latter in the socket. In order that the plunger may be withdrawn to admit the ball into the socket, the rear web, $C^3$, is apertured at $c^3$ and $c^4$, at opposite sides of the bearing of said plunger in said web in position to admit the said wings or lugs of the plunger at a certain position in the rotation of said plunger in its bearings. For so rotating the plunger it is provided with a radially-projecting stem or handle comprising two parts, E and E¹, the part, E, being rigid with the plunger, and the part, E¹, being a sleeve mounted on the part, E; and the housing or socket member, C, has a bayonet-lock slot, C⁵, comprising a longitudinally-extending portion, c⁵, and a circumferentially-extending portion, c⁶, out through which the stem or handle of the plunger protrudes for exterior engagement, so that the operator may first rock the plunger by moving the handle in the said circumferentially extending portion, c⁶, of the bayonet lock slot, and then moving it longitudinally, sliding the handle in the longitudinally-extending portion, c⁵, of said slot; said longitudinally-extending portion, c⁵, being positioned with respect to the apertures, c³ and c⁴, in the transverse web, C³, of the housing, so that when the stem or handle is in said longitudinal portion c⁵, of the slot, said wings or projections of the plunger are alined with said apertures of said web, C³, and pass through the apertures when the plunger is moved longitudinally by the handle in moving in said longitudinal portions, c⁵, of the slot. At the forward limit of movement of the plunger permitted by the form and position of the slot, C⁵, the rear shoulders of both the projections, D¹ and D², are forward of the forward side of the rear transverse web, C³, so that the plunger may be rotated or rocked in its bearings while said wings or projections are engaged forward of said transverse web, and the plunger is thereby locked at the position at which it retains the ball in the socket. Preferably the plunger is in snug engagement with the ball when thus locking it, so as to prevent all rattling; and to insure such snug engagement, one of said wings or projections, as D², and the marginal portion of the aperture c³, of the web, C³, with which said projection, D², engages, are relatively formed for camming upon each other in the rocking of the bolt to its locked position, to crowd the bolt forward in said rocking movement. A slight spiral beveling of each of these coöperating parts, namely, the wing or projection, D², and the marginal portion, c³⁰, of the aperture, c³, in the web, C³, serves to accomplish this purpose. Obviously it may be accomplished by spirally beveling one only of said features. In that case, preferably, the wing or projection, D², is thus spirally beveled so as to operate in the manner of a screw thread in the rotary movement of the plunger.

In order to adapt the plunger to be adjusted to slight variations, which will arise or will occur in construction, in the diameter of the ball, or in the diameter of the socket cavity, said plunger is provided with a separable head, F, having its forward end suitably concave to fit the ball, and having a stem, F¹, which extends axially within the plunger, D, which is axially hollow for that purpose, and which being interiorly threaded at the rear end of its axial cavity, has screwed into said rear end a stop bolt, G, provided forward of its head with a lock nut, G¹, which stop bolt may be adjusted in the plunger to force the head member thereof forward to cause said head to press the ball at all times snugly into the socket and take up any lost motion that may result from wear or variation in the original diameters of the ball or socket. For the purpose of preventing the plunger from being accidentally rocked in the bearings so as to release the ball, the two part construction of the stem or handle of this plunger is adopted, the sleeve, E¹, being counterbored to accommodate the spring, H, coiled about the stem, E, and reacting between the bottom of the counterbore and the stop nut, E², screwed on to the end of the stem, to normally thrust the sleeve inward toward the top of the boss, D¹, into which the stem is screwed. The diameter of the stem is such as to permit it to move freely in the bayonet lock slot C⁵; and said slot has at the extremity of its circumferentially-extended portion, c⁶, an enlargement, C⁶, to accommodate the diameter of the sleeve, at its inner end portion so that the latter may pass into said enlargement; and when thus entered, it will be seen that the plunger is locked against movement in its bearings either by sliding or rotating. For releasing the plunger and rotating and sliding it, as permitted by the form of the bayonet lock slot, the sleeve is pulled outward by means of the handle with which its outer end is provided, withdrawing its inner end from the enlargement, C⁶, bringing the stem which constitutes a neck in relation to the handle into line with the bayonet lock slot, so that the handle as a whole can be moved through said slot.

We claim:—

1. A tractor trailer coupling comprising a socket member open rearwardly; a ball member for engaging the socket; a plunger mounted in the socket member for holding the ball in the socket, the socket member comprising a housing for the plunger having transverse webs in which the plunger is rotatably and slidably journaled, the plunger having projections stopped against one of said webs, said webs having apertures through which the projection may pass by longitudinal movement of the plunger at a certain point in its rotary movement, and means for rotating and sliding the plunger.

2. In a structure such as set out in claim 1 the housing having a bayonet-lock slot, the means for rotating and sliding the plunger being a stem extending from the plunger out through said slot.

3. In a structure such as set out in claim 1, one of the projections of the plunger and the transverse web of the housing in which that projection engages being correlatively formed for camming the plunger longitudinally in the concluding portion of its rotary movement in one direction, for crowding the plunger toward the ball.

4. In a structure such as set out in claim 2 foregoing, the stem comprising a part radially movable with respect to the plunger for exposing a reduced portion or neck of the stem in the bayonet-lock slot, said slot being of a width for accommodating the said reduced neck, except at one point, and having at that point an enlargement to the full diameter of the stem adjacent to said neck, and means for holding said stem member normally inthrust to position said adjacent part of the said stem member in said enlargement of the slot.

5. In a structure such as set out in claim 4 foregoing, the movable member of the stem being a sleeve and the stem comprising a central part on which said sleeve slides for uncovering the stem which forms the neck; a spring reacting between the sleeve and the central part for yieldingly holding the sleeve in said enlargement of the slot.

6. A trailer coupling comprising a socket member opened rearwardly; a plunger mounted in the socket member for holding a ball in the socket; means for stopping the plunger longitudinally in the socket member, the plunger comprising a head for seating against the ball having a stem which extends loosely in the body of the plunger, and a thrust bolt screwed into the opposite end of the plunger for impinging on the end of said stem to limit the movement of said head rearward.

7. A tractor trailer coupling comprising a socket member for attachment to the trailer, open rearwardly and also open downwardly to admit a ball member; and a bracket for attachment to the tractor having at the rear end an upwardly and forwardly projecting stem, and a ball for seating in the socket terminating said stem.

In testimony whereof, we have hereunto set our hands at Edgerton, Wis., this 7th day of Sept., 1917.

JAMES W. MENHALL.
CHARLES G. CLEMENT.